United States Patent
Yao

(10) Patent No.: US 10,934,100 B2
(45) Date of Patent: Mar. 2, 2021

(54) MATERIAL HANDLING METHOD AND SYSTEM

(71) Applicants: HKC Corporation Limited, Shenzhen (CN); Chongqing HKC Optoelectronics Technology Co., ltd., Chongqing (CN)

(72) Inventor: Jiapeng Yao, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 257 days.

(21) Appl. No.: 16/087,813

(22) PCT Filed: Jul. 26, 2017

(86) PCT No.: PCT/CN2017/094561
§ 371 (c)(1),
(2) Date: Sep. 24, 2018

(87) PCT Pub. No.: WO2018/166134
PCT Pub. Date: Sep. 20, 2018

(65) Prior Publication Data
US 2019/0106282 A1   Apr. 11, 2019

(30) Foreign Application Priority Data

Mar. 17, 2017   (CN) .......................... 201710160239.9

(51) Int. Cl.
*B65G 43/08* (2006.01)
*G02F 1/13* (2006.01)

(52) U.S. Cl.
CPC .......... *B65G 43/08* (2013.01); *G02F 1/1303* (2013.01); *B65G 2203/0258* (2013.01); *B65G 2203/0266* (2013.01); *B65G 2811/0673* (2013.01)

(58) Field of Classification Search
CPC ............ B65G 43/08; B65G 2811/0673; B65G 2203/0258; B65G 2203/0266; G02F 1/1303
USPC .................................................. 700/213–230
See application file for complete search history.

(56) References Cited

U.S. PATENT DOCUMENTS

| | | | | |
|---|---|---|---|---|
| 4,648,056 A | * | 3/1987 | Wakefield | ............ G01G 15/006 177/25.14 |
| 6,125,306 A | * | 9/2000 | Shimada | .......... G05B 19/41865 700/217 |
| 6,721,615 B2 | * | 4/2004 | Fava | ................ G01N 35/00603 700/99 |
| 9,745,137 B1 | * | 8/2017 | McCafferty | ............ B65G 47/54 |

(Continued)

Primary Examiner — Michael Collins
(74) Attorney, Agent, or Firm — WPAT, PC

(57) ABSTRACT

The disclosure provides a material handling method and system. The method includes: obtaining a carrying load of at least two carrying devices on a current production line in a present working period; adjusting a carrying area of at least two carrying devices according to the carrying load, and/or, adjusting the carrying priority level of the sharing carrying sub-area and the independent carrying sub-area of at least two carrying devices according to the carrying load. Each carrying area of one carrying device comprises a sharing carrying sub-area and an independent carrying sub-area.

10 Claims, 3 Drawing Sheets

(56) References Cited

U.S. PATENT DOCUMENTS

| | | | | |
|---|---|---|---|---|
| 2002/0147515 | A1* | 10/2002 | Fava | G01N 35/0099 700/95 |
| 2004/0129150 | A1* | 7/2004 | Lancaster, III | B65G 61/00 99/486 |
| 2004/0176874 | A1* | 9/2004 | Kvisgaard | B07C 5/18 700/240 |
| 2009/0065330 | A1* | 3/2009 | Lupton | B65G 43/08 198/357 |
| 2009/0299521 | A1* | 12/2009 | Hansl | B65G 1/1378 700/215 |
| 2013/0123970 | A1* | 5/2013 | Yoshida | G05B 19/41815 700/214 |
| 2016/0145044 | A1* | 5/2016 | Mountz | B65G 1/1373 700/216 |
| 2016/0221762 | A1* | 8/2016 | Schroader | B65G 43/08 |
| 2018/0339865 | A1* | 11/2018 | Schroader | G06K 9/00771 |

* cited by examiner

MATERIAL HANDLING METHOD AND SYSTEM

FIELD OF THE DISCLOSURE

The present disclosure relates a material handling method and a system.

BACKGROUND OF THE INVENTION

With the development of display technology, liquid crystal display products have been widely used.

The Stocker Schedule system (SSS) is one of the important working systems in the production of liquid crystal display. The main role of the SSS is to assist the automation department to carry and store the material for production. However, in the process of material carrying, there are some imbalance of the carrying load of multiple carrying devices. The carrying devices are too idle available or too busy and, and therefore production efficiency is affected.

SUMMARY OF THE INVENTION

The present disclosure provides a material handling method and system in order to balance carrying loads of carrying devices.

In one aspect, an embodiment in the present disclosure provides a material handling method, the method includes: obtaining a carrying load of at least two carrying devices on a current production line in a current working period; adjusting carrying area of the at least two carrying devices according to the carrying load.

In the second aspect, an embodiment in the present disclosure also provides a material handling system, the system includes: at least two carrying devices and a handling controller, the handling controller comprising a carrying load obtaining module and an carrying adjusting module; wherein the carrying load obtaining module is adapted to obtain the carrying load of at least two carrying devices on the current production line in a present working period; the carrying adjusting module is adapted to adjust the size of the carrying areas of at least two carrying devices according to the carrying load.

In the third aspect, an embodiment in the present disclosure also provides a material handling system includes: a production line, wherein the production line includes a first carrying sub-area, a second carrying sub-area and a sharing carrying area; a first carrying device is adapted to carry material in the first carrying sub-area and the sharing carrying area; a second carrying device adapted to carry material in the second carrying sub-area and the sharing carrying area; and an adjust device adapted to adjust the size of the first carrying sub-area, the second carrying sub-area and the sharing carrying area according to the load of the first carrying device and the load of the second carrying device.

The present disclosure of the material handling method and system is able to make a balance with the carrying load of each carrying devices.

BRIEF DESCRIPTION OF THE DRAWINGS

In order to more clearly illustrate technical solutions of embodiment of the present disclosure for those skilled in the art, drawings will be used in the description of embodiment in the present disclosure as following.

DETAILED DESCRIPTION OF THE PREFERRED EMBODIMENTS

In the following, a detailed explanation of the present disclosure is made with reference to accompanying drawings of embodiment. It is understandable that the embodiment described here are set to explain the present disclosure rather than causing restriction of the present disclosure. What is more, in order to be easy to describe, the figure shows only parts of the present disclosure rather than the entire structure. In the absence of conflict, the following embodiment and the characteristics of the embodiment can be arbitrarily combined.

Figure 1:
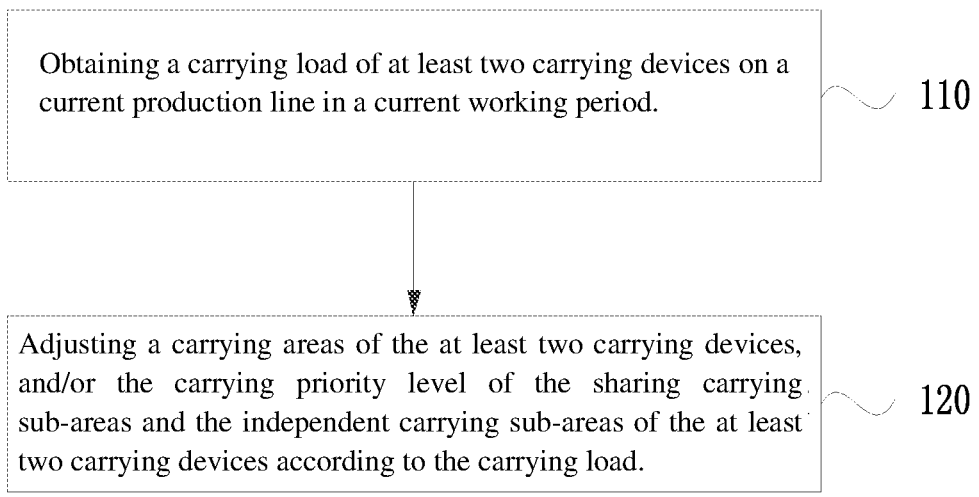
FIG. 1 is flow chart of a material handling method in an embodiment of the present disclosure.

FIG. 1 is flow chart of a material handling method in an embodiment of the present disclosure.

The embodiment can be used to adjust the carrying load of the carrying devices. The method can be carried out by the material handling system and the method includes the following steps.

Step 110, obtaining the carrying load of at least two carrying devices on a current production line in a present working period.

The carrying devices are mainly responsible for carrying the material needed in the production process. The carrying load can be an amount of material which is required to carry by the carrying devices.

Step 120, according to the carrying load, sizes of carrying areas of the at least two carrying devices, and/or, a carrying priority level of each sub-area of the at least two carrying devices can be adjusted.

Each carrying area of the carrying devices includes a sharing carrying sub-area and an independent carrying sub-area.

The independent carrying sub-area of the carrying device can be used for the said carrying device independently carrying the material. The sharing carrying sub-area can be used for the said carrying device and other carrying devices carrying the material together.

A comparison can be made between a carrying load and a preset carrying load of each carrying device. If the difference between the carrying load and the preset carrying load of one carrying device is greater than a first preset threshold, or the difference between the carrying load and the preset carrying load of one carrying device is smaller than a second preset threshold, then the carrying load of the carrying device becomes too larger or too smaller. The size of the carrying area of the carrying device can be adjusted, and/or, the carrying priority level of each carrying sub-area can be adjusted. As such, a balance can be made on the workload of each of carrying devices by adjusting the carrying load. In addition, the difference between the carrying loads of those carrying device with the same sharing carrying sub-area can be calculated, and the size of the carrying area of each carrying devices can be adjusted, and/or the carrying priority level of each carrying sub-area can be adjusted according to the difference.

In an alternative embodiment, there are two carrying devices on the current production line. The sizes of the carrying areas of the two carrying devices can be adjusted according to the carrying load. And/or adjusting the carrying priority level of each carrying sub-area of at least two carrying devices according to the carrying load includes: calculating a load difference between the carrying loads of the two carrying devices; if the load difference is greater than or equal to a first load threshold, then adjusting the sizes of the carrying areas of the two carrying devices; and/or adjusting the carrying priority level of each carrying sub-area of the two carrying devices according to the load difference.

The first load threshold can be set according to needs and not to be restricted. Whether the load loads of two carrying devices are balanced or not can be judged by calculating the load difference between two carrying devices. If the load difference is greater than or equal to the first load threshold, it is said that there is a large difference between the carrying loads of the two carrying devices. In other words, one carrying device is relatively busier and the other carrying device is relatively idler. At this time, the carrying area or the carrying priority level of the two carrying devices can be adjusted according to the load difference in order to balance the carrying loads between the two carrying devices, and therefore handling efficiency and production efficiency can be enhanced.

In an alternative embodiment, adjusting the sizes of the carrying areas of at least two carrying devices according to the carrying load can include: increasing the carrying area of the carrying device with a smaller carrying load, decreasing the carrying area of the carrying device with a larger carrying load.

The disposition can decrease the carrying load of the carrying device with a larger carrying load and increase the carrying load of the carrying device with a smaller carrying load. So a balance can be made to the carrying load of each carrying devices. What is more, the diminished portion of the carrying area of the carrying devices with lager load can be used as the increased portion of the carrying area of the carrying devices with smaller load.

Optionally, after being adjusting the size of the carrying area of at least two carrying devices according to the carrying load includes: increasing the sharing carrying sub-areas of the carrying device with a smaller carrying load, and decreasing the independent carrying sub-area of the carrying device with a larger carrying load.

Figure 2A:
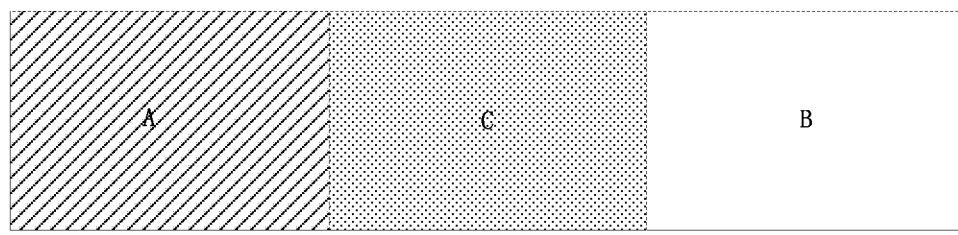
FIG. 2a is schematic view of carrying areas of a carrying device in an embodiment of the present disclosure before being adjusting.
Figure 2B:
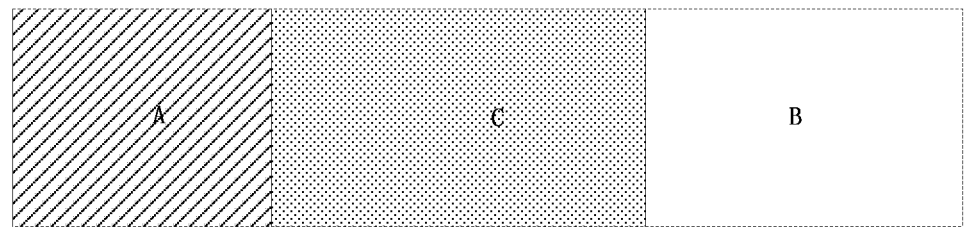
FIG. 2b is schematic view of carrying areas of a carrying device in an embodiment of the present disclosure after being adjusted.

FIG. 2a is schematic view of carrying areas of a carrying device in an embodiment of the present disclosure before being adjusting. FIG. 2b is schematic view of carrying areas of a carrying device in an embodiment of the present disclosure after being adjusting. Referring to FIG. 2a, take two carrying devices for example, the carrying area of a first carrying device includes: an independent carrying sub-area A and a sharing carrying sub-area C, the carrying area of a second carrying device includes: an independent carrying sub-area B and a sharing carrying sub-area C. The material in the sharing carrying sub-area C is carried by the first carrying device and the second carrying device together. When the carrying load of the first carrying device is lager and the carrying load of the second carrying device is smaller, the first carrying device relatively becomes busier and the second carrying device becomes less busy. Referring to FIG. 2b, the sharing carrying sub-area C can be able to increase and the independent carrying sub-area can be decreased. A of the first carrying device in order that the second carrying device can distribute some carrying task from the first carrying device and make a balance between the carrying loads of the two carrying devices.

Adjusting the carrying priority level of each sub-area of at least two carrying devices comprises: for the carrying device with a larger carrying load, adjusting the carrying priority level of the independent carrying sub-area greater than the carrying priority level of the sharing carrying sub-area; for the carrying device with a smaller carrying load, adjusting the carrying priority level of the sharing carrying sub-area greater than the carrying priority level of the independent carrying sub-area.

Take two carrying devices for example, referring to FIG. 2b, for the first carrying device with a larger carrying load, the carrying priority level of the independent carrying sub-area A is greater than the carrying priority level of the sharing carrying sub-area C. And for the second carrying device with a smaller carrying load, the carrying priority level of the sharing carrying sub-area C is greater than the carrying priority level of the independent carrying sub-area B.

The material in the sharing carrying sub-area C is carried by the first carrying device and the second carrying device together. When the carrying load of the first carrying device is lager and the carrying load of the second carrying device is smaller, the first carrying device relatively becomes busier and the second carrying device becomes less busy. Referring to FIG. 2b, the sharing carrying sub-area C can be increased and the independent carrying sub-area A of the first carrying device can be decreased in order that the second carrying device can distribute some carrying task from the first carrying device and make a balance between the carrying loads of the two carrying devices. It means that the carrying device with a smaller carrying load can be shared portion of the workload of the carrying device with lager carrying load so as to improve the efficiency and the productivity.

Besides, in the actual production line the original location (material storage location) and the target location of the material delivery may be in the same carrying sub-area or not in the same carrying sub-area. It can be divided into some cases as following:

First case: the original location is in the independent carrying sub-area and the target location is in the independent carrying sub-area Second case: the original location is in the independent carrying sub-area and the target location is in the sharing carrying sub-area;

Third case: the original location is in the sharing carrying sub-area and the target location is in the sharing carrying sub-area.

For the carrying device with a larger carrying load, it should be prioritized for carrying in the first case and followed by the second case, finally the third case.

For the carrying device with a smaller carrying load, it should be prioritized for carrying in the second case and followed by the third case, finally the first case. It is a priority to carry the independent carrying sub-area when the carrying device with a lager carrying load, and it is a priority to carry the sharing carrying sub-area when the carrying device with a smaller carrying load. A balance can be made between the two carrying device workload so as to improve the efficiency and the productivity.

Figure 3:
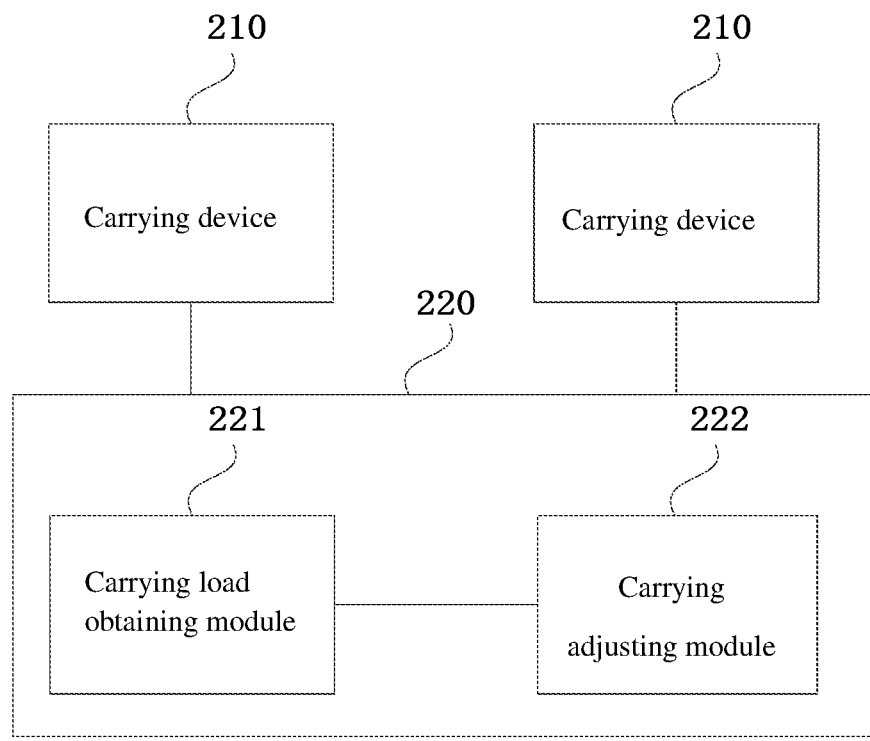
FIG. 3 is schematic view of a material handling system in an embodiment of the present disclosure.

In this example, a balance can be made between the carrying loads of each carrying devices by obtaining the carrying load of at least two carrying devices on a current production line in a present working period, and adjusting the size of the carrying areas of at least two carrying device according to the carrying load; and/or, adjusting the carrying priority level of each sub-areas of at least two carrying devices. FIG. 3 is Schematic view of a material handling system in an embodiment of the present disclosure. Referring to FIG. 3, the system includes: at least two carrying devices 210 and a handling controller 220; the handling controller 220 includes a carrying load obtaining module 221 and an carrying adjusting module 222; wherein the carrying load obtaining module 221 is configured to obtain the carrying load of at least two carrying devices on the current production line in a present working period.

The carrying adjusting module 222 is configured to adjust the size of the carrying areas of the at least two carrying devices according to the carrying load, and/or, adjust the carrying priority level of each carrying sub-areas of the at least two carrying devices. The carrying area of each carrying devices includes a sharing carrying sub-area and an independent carrying sub-area.

Figure 4:
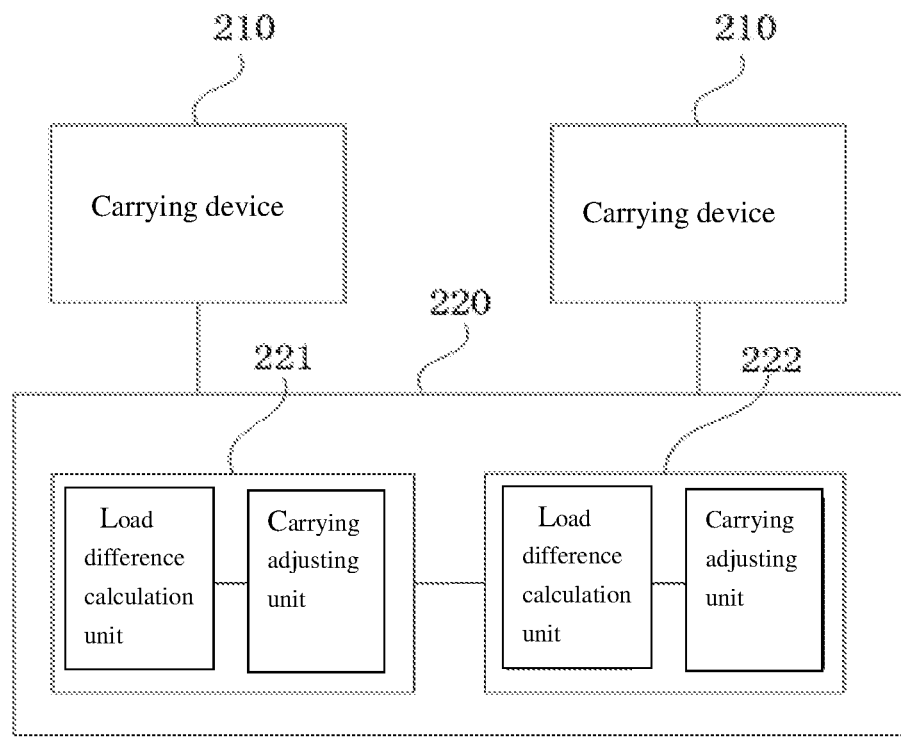
FIG. 4 is schematic view of a material handling system in an embodiment of the present disclosure.

Referring to FIG. 4, there are two carrying devices on the current production line, the carrying adjusting module 222 includes: a load difference calculation unit and a carrying adjusting unit.

The load difference calculation unit can be configured to calculate the load difference between the carrying loads of the two carrying devices.

The carrying adjusting unit can be configured to according the load difference to adjust the size of the carrying areas of the two carrying devices; and/or, to adjust the carrying priority level of each carrying sub-areas of the two carrying devices if the load difference is greater than or equal to the first load threshold.

The carrying adjusting module 222 can be configured to: increase the carrying area of the carrying device with a smaller carrying load, decrease the carrying area of the carrying device with a larger carrying load.

Figure 5:
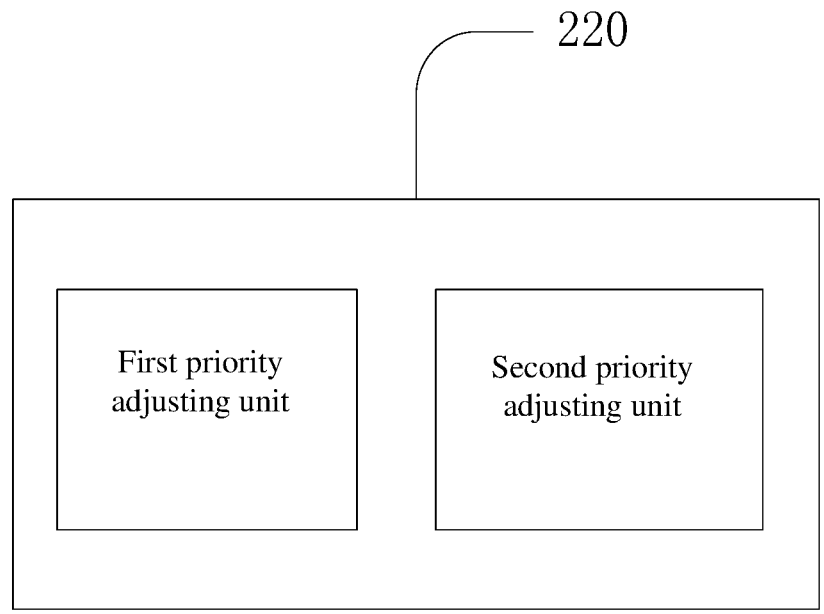
FIG. 5 is schematic view of a carrying adjusting module in an embodiment of the present disclosure.

Referring to FIG. 5, the carrying adjusting module 222 includes: A first priority adjusting unit and A second priority adjusting unit.

The first priority adjusting unit can be adapted to adjust the carrying priority level of the independent sub-area is greater than the carrying priority level of the sharing sub-area for the carrying device with a larger carrying load.

The second priority adjusting unit can be adapted to adjust the carrying priority level of the sharing sub-area is greater than the carrying priority level of the independent sub-area for the carrying device with a smaller carrying load.

Figure 6:
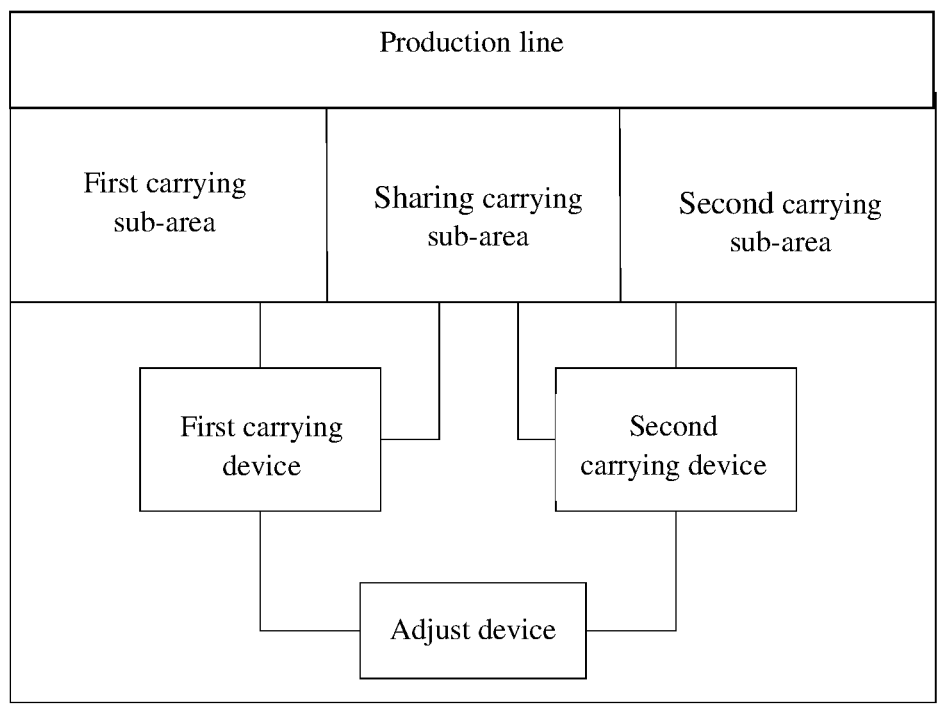
FIG. 6 is schematic view of a material handling system in an embodiment of the present disclosure.

Referring to FIG. 6, the present disclosure still offer another material handling system, the system includes: a production line, a first carrying device, a second carrying device and an adjust device.

The production line includes a first carrying sub-area, a second carrying sub-area and a sharing carrying area.

The first carrying device can be adapted to deliver the material in the first carrying sub-area and the sharing carrying area.

The second carrying device can be adapted to deliver the material in the second carrying sub-area and the sharing carrying area.

The adjust device can be adapted to adjust the first carrying sub-area, the second carrying sub-area and the sharing carrying area according to the load of the first carrying device and the load of the second carrying device.

When the load of the first carrying device is larger than the load of the second carrying device, the adjust device can be adapted to calculate the difference between the load of the first carrying device and the load of the second carrying device. If the difference greater than or equal to a first threshold, then decreasing the size of the first carrying sub-area and increasing the size of the second carrying sub-area. For example, a portion of the first carrying sub-area can be distributed to the second carrying sub-area.

When the load of the first carrying device is larger than the load of the second carrying device, the adjust device can be adapted to calculate the difference between the load of the first carrying device and the load of the second carrying device. If the difference greater than or equal to a first threshold, the size of the first carrying sub-area can be decreased and the size of the sharing carrying area can be increased.

When the load of the first carrying device is larger than the load of the second carrying device, the adjust device can be adapted to: calculate the difference between the load of the first carrying device and the load of the second carrying device. If the difference greater than or equal to a first threshold, the priority of the first carrying device working in the sharing carrying area can be increased, the first carrying device working in the first carrying area can be decreased. For example, the priority of the first carrying device working in the sharing carrying area is higher than the priority of the first carrying device working in the first carrying area. It means that the first carrying device makes a priority to carrying material in the sharing carrying area.

If the load of the first carrying device is greater than the second threshold, the adjust device can be adapted to decrease the size of the first carrying sub-area and increase the size of the sharing carrying area.

If the load of the first carrying device is greater than the second threshold, the adjust device can be adapted to decrease the size of the first carrying sub-area and increase the size of the second carrying area.

If the load of the first carrying device and the load of the second carrying device are both greater than the second threshold, the adjust device can be adapted to decrease the size of the first carrying sub-area and the second carrying sub-area and increase the size of the sharing carrying area.

For example, the adjust device includes processors and storage. The adjust device still includes input device and output device. The input device obtains the load of the first carrying device and the load of the second carrying device. The processors can calculate a result of the adjusted size or the priority of the first carrying sub-area, the second carrying sub-area and the sharing carrying area, according to the load of the first carrying device and the load of the second carrying device. The result of the adjusted size or the priority of the first carrying sub-area, the second carrying sub-area and the sharing carrying area can be sent to the first device and the second device by the output device. The first device and the second device have been adjusted and delivered the material according to the first carrying sub-area, the second carrying sub-area and the sharing carrying area.

The material handling system in the present embodiment is in the same conception as the material handling method in any embodiment of the present disclosure. The method can carry out the material handling method in any embodiment of the present disclosure and have the relative function module and beneficial effect of the material handling method during execution time. Technical details that are not described in detail in this embodiment can be found in the material handling method in any embodiment of the present disclosure.

In addition, the functional units (or modules) in respective embodiments of the disclosure may be integrated into one processing unit, or may be individually physically presented, or two or more than two units are integrated into one unit. The integrated unit can be implemented in a form of hardware, or implemented in a hybrid form of hardware and software functional unit(s).

The integrated unit implemented through software functional units or modules can be stored in a computer readable storage medium. The software function units stored in a storage medium include a plurality of instructions to make a processor(s) of a computer device (may be personal computer, a server or a network device, etc.) perform some of the steps of the methods described in respective embodiments of the disclosure. The storage medium may be a USB disk, a mobile hard disk, a read-only memory (ROM), a random access memory (RAM), a magnetic disk, an optical disk, or other medium can store program codes.

It is note that embodiment in the present disclosure is only a relatively good example of the implementation and the technical principles used. It will be understood by those skilled in the art that the present disclosure is not limited to the embodiment described herein and that various changes, modifications and substitutions will occur to those skilled in the art without departing from the scope of the present disclosure. Accordingly, although the present disclosure has been described in more detail by way of the above examples, the present disclosure is not limited to the above embodiment, and other equivalent embodiment may be included without departing from the spirit of the present disclosure Is to be determined by the scope of the appended claims.

What is claimed is:

1. A material handling method comprising:
   obtaining carrying loads of a first carrying device and a second carrying device respectively on a current production line in a current working period, wherein the first and second carrying devices are responsible for carrying materials needed in a production process, and the carrying loads are amounts of materials which are required to be carried by the first and second carrying device;
   adjusting carrying areas corresponding to the first and second carrying devices according to the carrying loads, wherein the carrying area of the first carrying device comprises a sharing carrying sub-area and a first independent carrying sub-area, the carrying area of the second carrying device comprises the sharing carrying sub-area and a second independent carrying sub-area, the first independent carrying sub-area is used for the first carrying device independently carrying the material therein, the second independent carrying sub-area is used for the second carrying device independently carrying the material therein, and the sharing carrying sub-area is used for both the first and second carrying devices carrying the material therein; and
   adjusting carrying priority levels of the sharing carrying sub-area and the first and second independent carrying sub-areas of the first and second carrying devices according to the carrying loads, comprising:
   for the first carrying device with a larger carrying load, adjusting the carrying priority level of the first independent carrying sub-area to be greater than the carrying priority level of the sharing carrying sub-area;
   for the second carrying device with a smaller carrying load, adjusting the carrying priority level of the sharing carrying sub-area to be greater than the carrying priority level of the second independent carrying sub-area.

2. The method as claimed in claim 1, wherein there are two carrying devices comprising the first and second carrying devices on the current production line, and adjusting the carrying areas of corresponding to the first and second carrying devices according to the carrying loads comprises:
   calculating a difference between the carrying loads of the two carrying device;
   if the difference is greater than or equal to a first threshold, adjusting the carrying priority level of the sharing carrying sub-area and the first and second independent carrying sub-areas of the two carrying devices according to the carrying loads.

3. The method as claimed in claim 1, wherein there are two carrying devices comprising the first and second carrying devices on the current production line, and adjusting the carrying areas corresponding to the first and second carrying devices according to the carrying loads comprises:
   calculating a difference between the carrying loads of the two carrying devices;
   if the difference is greater than or equal to a first threshold, adjusting sizes of the carrying areas of the two carrying devices according to the difference.

4. The method as claimed in claim 1, wherein adjusting the carrying areas corresponding to the first and second carrying devices according to the carrying loads comprises:
   increasing the carrying area of the second carrying device with the smaller carrying load, decreasing the carrying area of the first carrying device with the larger carrying load, wherein a decreased portion of the carrying area of the carrying devices with lager load is used as an increased portion of the carrying area of the carrying devices with smaller load.

5. The method as claimed in claim 1, adjusting carrying areas corresponding to the first and second carrying devices according to the carrying loads, comprises:
   increasing the sharing carrying sub-area of the second carrying device with the smaller carrying load, and decreasing the first independent carrying sub-area of the first carrying device with the larger carrying load.

6. A material handling system comprising:
   a first carrying device and a second carrying and a handling controller, wherein the first and second carrying devices are responsible for carrying materials needed in a production process, and the carrying loads are amounts of materials which are required to be carried by the first and second carrying device, the handling controller comprising a carrying load obtaining module and an carrying adjusting module, wherein,
   the carrying load obtaining module is adapted to obtain carrying loads of a first carrying device and a second carrying device respectively on the current production line in a current working period;
   the carrying adjusting module is adapted to adjust the carrying areas corresponding to the first and second carrying devices according to the carrying loads, wherein the carrying area of the first carrying device comprises a sharing carrying sub-area and a first independent carrying sub-area, the carrying area of the second carrying device comprises the sharing carrying sub-area and a second independent carrying sub-area, the first independent carrying sub-area is used for the first carrying device independently carrying the material, the second independent carrying sub-area is used for the second carrying device independently carrying the material, and the sharing carrying sub-area is used for both the first and second carrying devices carrying the material; and wherein the carrying adjusting module comprises:
- a first priority adjusting unit adapted to, for the first carrying device with a larger carrying load, adjust the carrying priority level of the first independent carrying sub-area to be greater than the carrying priority level of the sharing carrying sub-area;
- a second priority adjusting unit adapted to, for the second carrying device with a smaller carrying load, adjust the carrying priority level of the sharing carrying sub-area to be greater than the carrying priority level of the second independent carrying sub-area.

7. The system as claimed in claim 6, wherein there are two carrying devices comprising the first and second carrying devices on the current production line, the carrying adjusting module comprises:
- a load difference calculation unit adapted to calculate a load difference between the carrying loads of the two carrying devices;
- a carrying adjusting unit, if the load difference is greater than or equal to a first threshold, the carrying adjusting unit adapted to adjust sizes of the carrying areas of the two carrying devices according to the load difference.

8. The system as claimed in claim 7, the carrying adjusting module is configured for adjusting the carrying priority level of each sub-area of the two carrying devices according to the load difference.

9. The system as claimed in claim 6, wherein the carrying adjusting module is configured for:
- increasing the carrying area of the second carrying device with the smaller carrying load, decreasing the carrying area of the first carrying device with the larger carrying load, wherein a decreased portion of the carrying area of the carrying devices with a lager load is used as an increased portion of the carrying area of the carrying devices with a smaller load.

10. The system as claimed in claim 7, wherein the carrying adjusting module is configured for:
- increasing the carrying area of the second carrying device with the smaller carrying load, decreasing the carrying area of the first carrying device with the larger carrying load, wherein a decreased portion of the carrying area of the carrying devices with lager load is used as an increased portion of the carrying area of the carrying devices with smaller load.

* * * * *